United States Patent [19]
O'Neill et al.

[11] B 3,997,040
[45] Dec. 14, 1976

[54] TRANSMISSION CONTROL CONSOLE WITH RECESSED BRAKE LEVER

[75] Inventors: Frederick C. O'Neill; Alfred W. Sieving, both of Macon County, Ill.

[73] Assignee: Caterpillar Tractor Co., Peoria, Ill.

[22] Filed: Dec. 10, 1974

[21] Appl. No.: 531,267

[44] Published under the second Trial Voluntary Protest Program on February 24, 1976 as document No. B 531,267.

[52] U.S. Cl. .................... 192/4 A; 74/491; 200/153 P; D12/179; 74/507; 74/479
[51] Int. Cl.² .......................... B60K 29/02
[58] Field of Search ............ 192/4 A, 4 C; 74/491, 74/507, 479, 480 B, 483 R; 200/61.86, 153 P; 194/4 B, 4 R, .098; D12/179

[56] References Cited
UNITED STATES PATENTS

| | | | |
|---|---|---|---|
| 2,039,553 | 5/1936 | Roehrl | 192/4 A |
| 3,410,151 | 11/1968 | Adams et al. | 74/483 |
| 3,626,780 | 12/1971 | Lowder et al. | 74/491 |
| 3,858,695 | 1/1975 | Whisler | 192/4 A |

*Primary Examiner*—Benjamin W. Wyche
*Attorney, Agent, or Firm*—Phillips, Moore, Weissenberger, Lempio & Strabala

[57] ABSTRACT

The invention comprises a console attachable to a vehicle to control a transmission thereof. The console comprises an enclosure which includes a plate atop the enclosure. The plate includes an indentation which forms a trough therein and further includes a channel passing through the plate in an upraised portion thereof adjacent the trough. A gearshift regulator extends through the channel, the regulator serving to control the transmission of a vehicle. A parking brake actuator is recessed within the trough. The actuator serves to control a parking brake of the vehicle.

6 Claims, 4 Drawing Figures

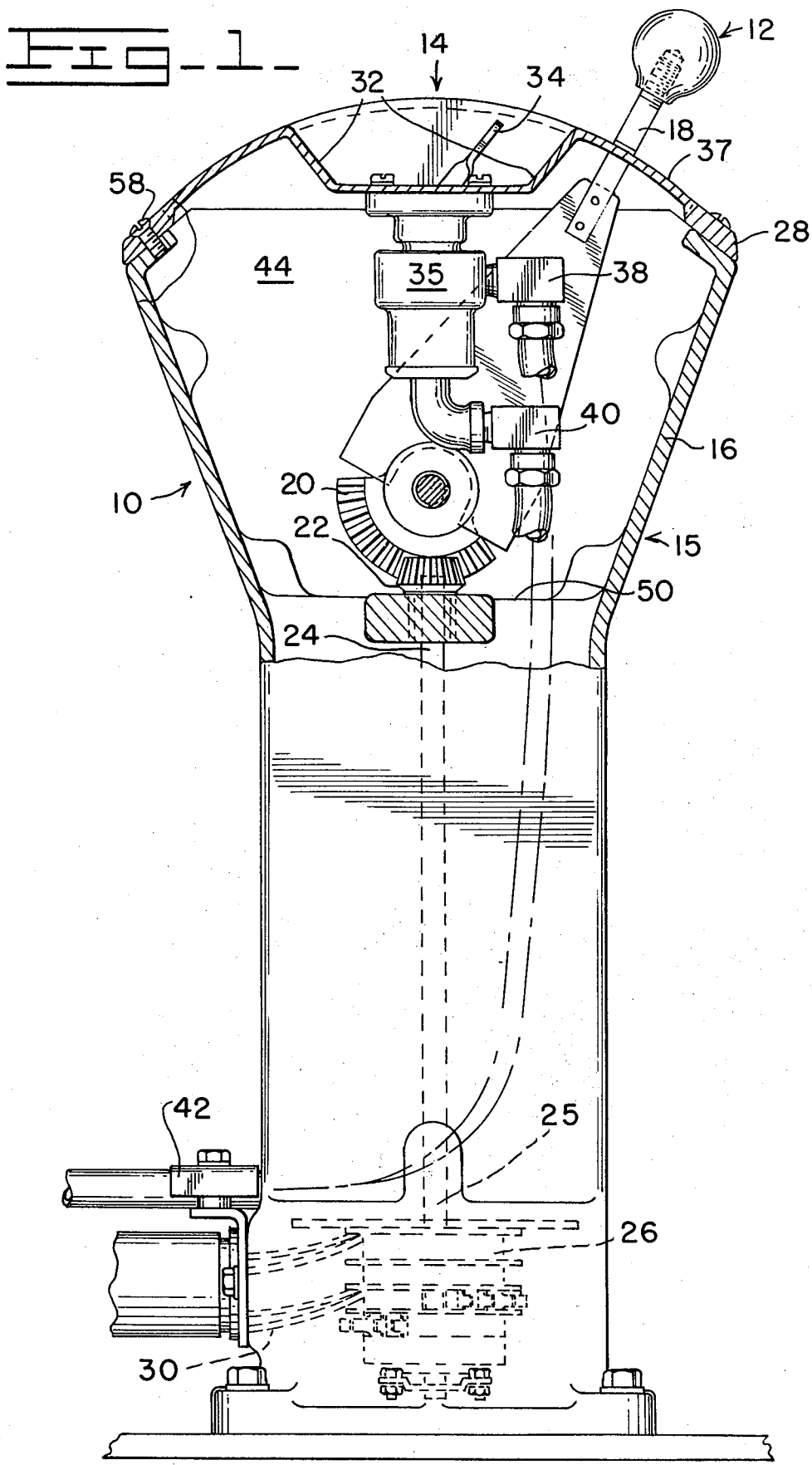

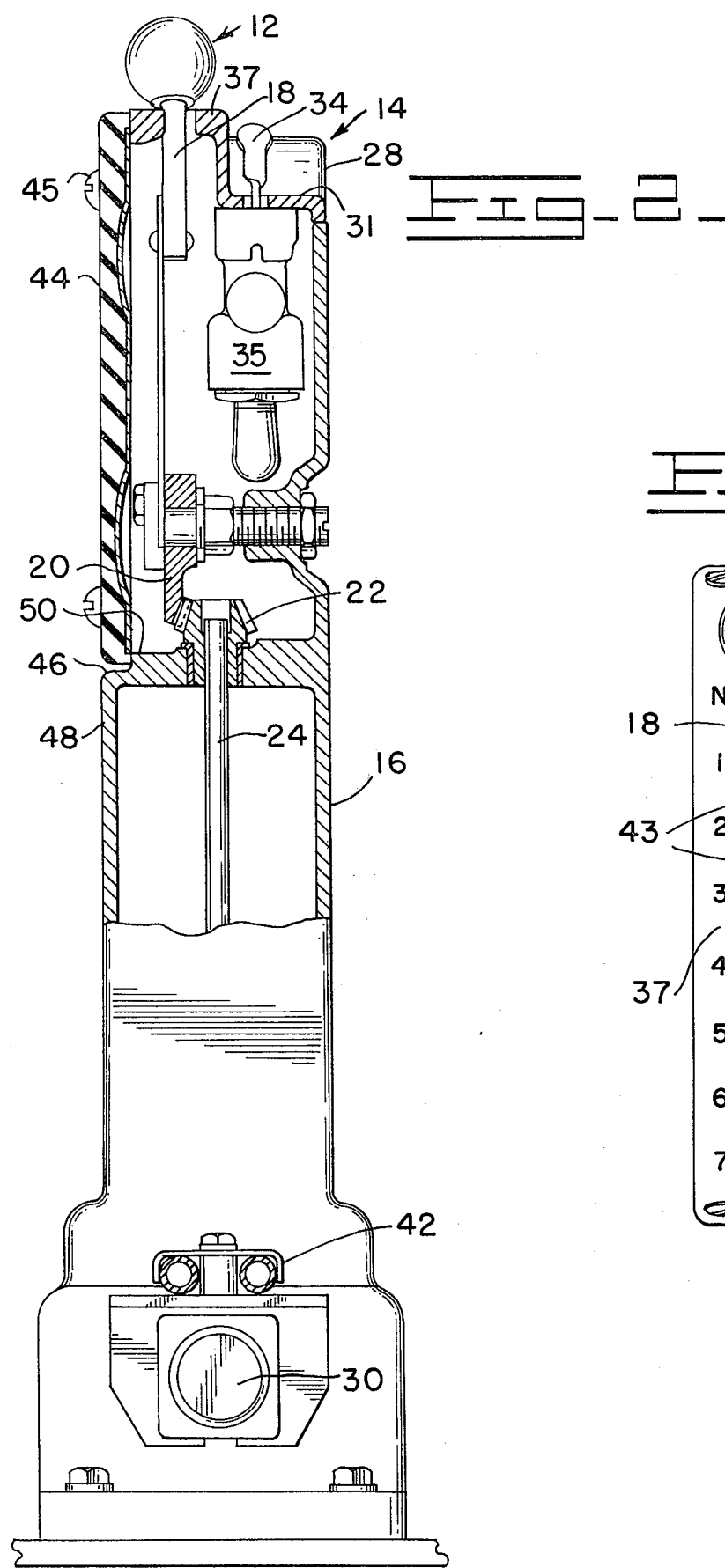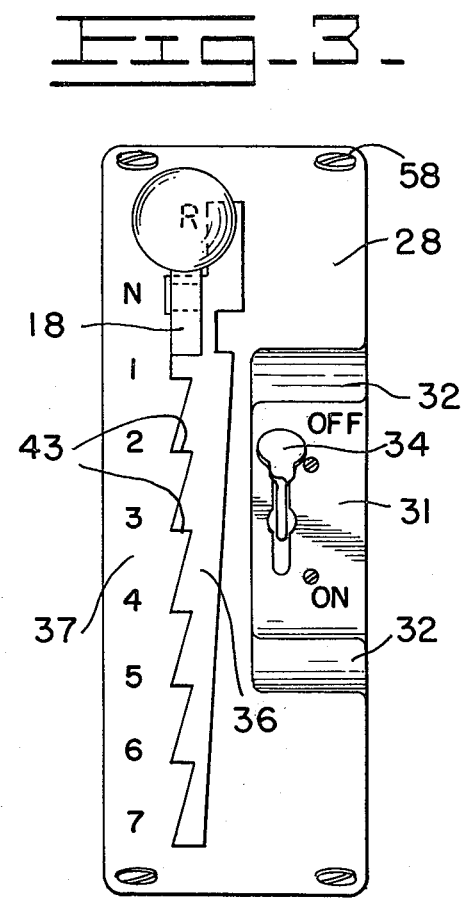

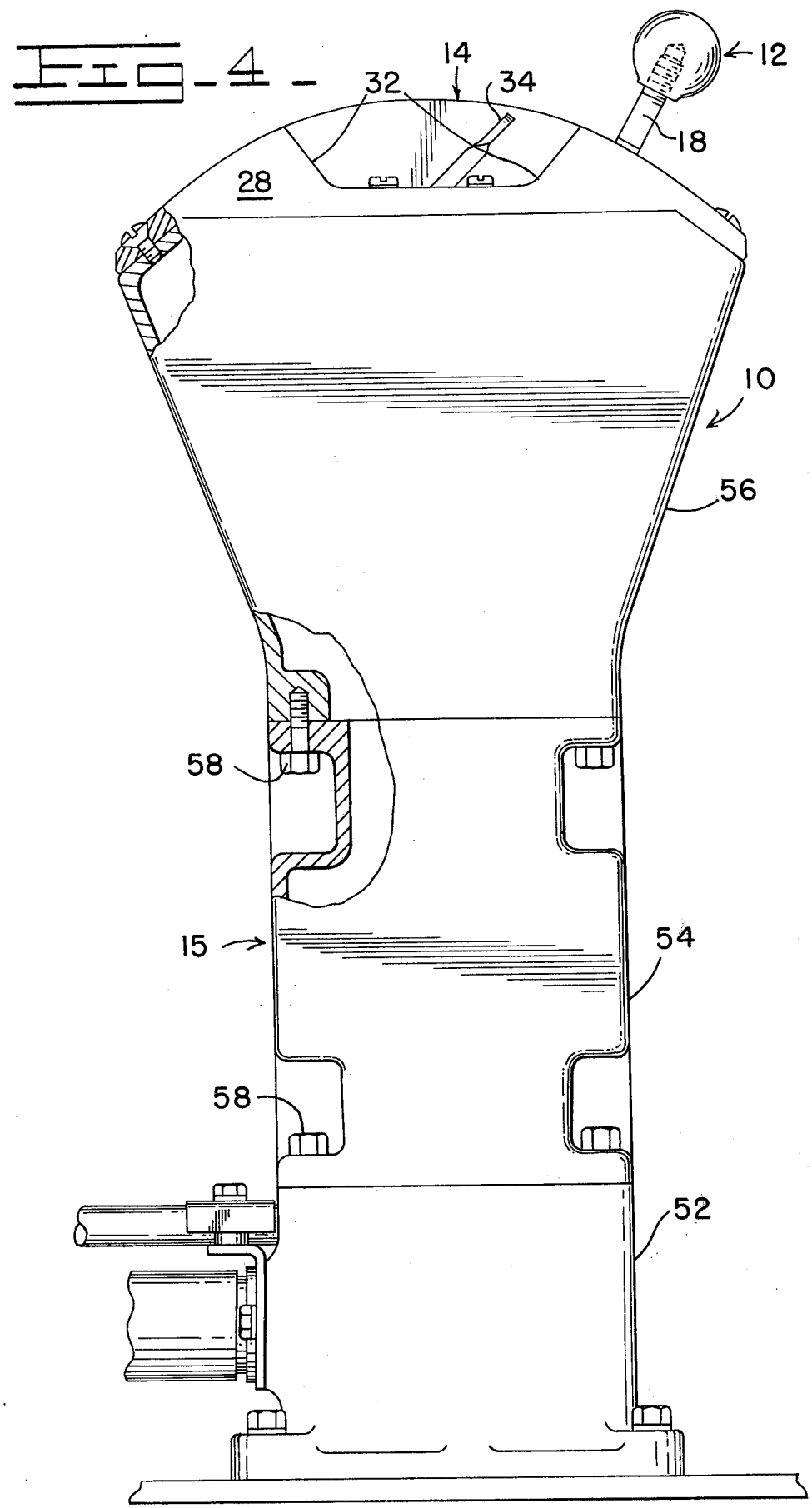

TRANSMISSION CONTROL CONSOLE WITH RECESSED BRAKE LEVER

BACKGROUND OF THE INVENTION

I. Field of the Invention

The present invention relates generally to transmission control consoles attachable to a vehicle and more particularly to power transmission control consoles for use in speed changing gearshift mechanisms which transmit power to the wheels of a vehicle such as, for example, an earth-moving machine. Still more particularly, the invention relates to such a transmission where electronic control means are provided to operate the gearshift mechanism and other transmission components.

II. Prior Art

U.S. Pat. No. 3,805,640, describes a useful electronically-controlled power transmission. When one is utilizing an electronically-controlled power transmission it is especially desirable that the operator of the vehicle with such a transmission be prevented from accidentally engaging the parking brake of the vehicle so as to prevent wearing out of the parking brake. Also, it is highly desirable that the operator be able to shift the transmission in a sure and positive manner without worrying about accidentally engaging the parking brake of the vehicle. Yet it is highly desirable that the parking brake engagement control lever be located conveniently close to the operator's hands and, hence, close to the shift lever which must also be located close to the operator's hands. Further, it is desirable that the operator or a mechanic be able to enter the console which controls the transmission of such a vehicle with ease to effect repairs therein and to adjust the mechanism therein. Still further, it is desirable that the console be properly padded so that the operator cannot easily harm himself during the heavy duty operation of, for example, an earth-moving vehicle such as an excavator or the like.

Accordingly, it is an object of the present invention to provide a console attachment to a vehicle to control a power transmission thereof, wherein the operator can positively and swiftly shift the transmission without any danger of his accidentally throwing on the parking brake of the vehicle, yet where the parking brake of the vehicle is easily available for use by the operator when he so desires and wherein entry into the console attachment to effect adjustment and/or repairs is facilitated.

SUMMARY OF THE INVENTION

The invention comprises a console attachment to a vehicle to control a transmission thereof. The console comprises an enclosure. The console further comprises a plate atop the enclosure, the plate including an identation forming a trough therein and including a channel through the plate in an upraised portion thereof adjacent said trough. Also part of the console is a gearshift regulator which extends through the channel, the regulator serving to control the transmission of a vehicle. Further, the console comprises a parking brake actuator recessed within the trough, the actuator serving to control a parking brake of the vehicle.

BRIEF DESCRIPTION OF THE DRAWINGS

The invention will be better understood by reference to the drawings, which illustrate a preferred embodiment of the invention, wherein like numbers denote like parts throughout and wherein:

FIG. 1 illustrates a side elevational view in partial section of the preferred embodiment of the control console of the present invention;

FIG. 2 illustrates an end elevational view in partial section of the embodiment illustrated in FIG. 1;

FIG. 3 illustrates a top view of the embodiment illustrated in FIGS. 1 and 2; and FIG. 4 illustrates a side elevational view in partial section of another preferred embodiment of the present invention.

DETAILED DESCRIPTION OF THE PREFERRED EMBODIMENT

The preferred embodiment of the subject invention illustrated in FIGS. 1 and 2 comprises a vehicle modular-type control console 10 that is completely pre-assemblable prior to being installed in a vehicle such as an earth-moving machine. The console 10 includes a gearshift regulator 12 and a parking brake control 14.

The housing of the console comprises an enclosure 15 including a single piece lower member 16 which is mounted to the floor of a vehicle operator's station (not illustrated) in a free standing position as determined by the specific vehicle control requirements or by an operator's individual preference. The gearshift regulator 12 includes the lever 18 which is rotatably connected by a miter gear segment 20, a miter gear 22 and a shaft 24 to an electrical switching mechanism 26 which signals operator-selected transmission speed and/or directional change to the transmission of the vehicle. Also part of the enclosure 15 is a transmission lever gating plate 28 which is removably attached to the upper most portion of the lower member 16 and serves to guide the lever 18 into an operator-selected transmission speed range with the lever movement causing a corresponding movement of the miter gear segment 20 that travels at an arc and meshes with the vertically oriented miter gear 22 that is mounted on the upper end of the vertically oriented shaft 24. The lower end 25 of the shaft 24 connects to the electrical switching mechanism 26. Different rotational positions of the shaft 24 thus lead to different switching within the switching mechanism 26 whereby signals are sent via a mating wire harness member 30 to control the transmission of the vehicle.

The structure of the plate 28 is quite important to the present invention. In particular, the plate 28 includes an indented part 31 thereof which leads to the formation of a short trough 32. Within the trough 32 is located the parking brake actuator 34 which controls an on/off-type air valve 35. The actuator 34 is thus recessed within the trough 32 so that the gearshift regulator 12 can be moved positively by the operator without fear of his accidentally engaging the actuator 34. Further, since the actuator 34 is present right at the top of the console 10, the operator can easily engage it when he so desires without the necessity for bending or stooping. As will be noted by reference to the figures, the gearshift regulator 12 moves through a channel 36, the length of the channel 36 being parallel to the direction of movement of the actuator 34, in an upraised portion 37 of the plate 28, which upraised portion is adjacent the trough 32. This close juxtapositioning of the controls, that is of the gearshift regulator 12 and the parking brake actuator 34, allows for very efficient operation of the console without great movement by the operator. The positioning of the brake control valve 35 and its two air line connections 38 and 40 inside of the enclosure 15 provides protection for these components. The air lines from the connections 38 and 40 pass downwardly through the enclosure 15 and are attached where they exit adjacent the bottom thereof by a hose clamping means 42 and thereafter connect to the vehicle air line system of the parking brake control mechanism.

The channel 36 includes therein a plurality of stops 43 which serve to provide positive step-wise adjustment of the regulator 12 and thereby of the transmission by stopping the lever 18 thereof.

The enclosure 15 totally encloses the transmission control mechanism and the parking brake control elements with the exception of the gearshift regulator 12 and the parking brake actuator 34. Thus, a vehicle control console is provided that is comfortable to use and protects all the associated mechanisms from external damage but leaves these mechanisms readily available for easy servicing, as will later become apparent. The control connection between the console and the vehicle are easily connected or disconnected and the entire modular console 10 can be bolted on or unbolted from the vehicle operator's station floor with ease.

The console 10 includes a removable padded panel 44 on the side of the enclosure 15. The panel 44 provides access to the interior of the console for repair, alignment and the like while the padding on the panel 44 serves to protect an operator from injury through striking said panel. In particular, the panel 44 is so placed as to protect the operators knee should he swivel in his seat in order to gain increased rearward vision, as when loading or unloading a trailing vehicle. The panel is fastened by the bolts 45 into a recessed area 46 in the console which allows the outer surface of the panel 44 to be substantially flush with the surrounding outer surface 48 of the enclosure 15. Thus, a smooth external appearance is provided to the console 10. The panel 34 when removed from the enclosure 15 provides an access opening 50 in the enclosure 15 whereby the parking brake control valve 35 and the hose connections 38 and 40 as well as a major part of the gearshift regulator 12 is accessible for easy removal, repair, adjustment or assembly in the enclosure 15.

As will be noted by reference paricularly to FIGS. 1, 2 and 3, the plate 28 is easily removable from the enclosure 15 as by simply removing the bolts 58. Also, the panel 44 is easily removed from the side of the enclosure 15 by simply removing the bolts 45.

ALTERNATE EMBODIMENT

FIG. 4 illustrates an alternate embodiment of the invention wherein the enclosure 15 is made up of a base member 52, a central member 54 and an upper member 56, all held together by the bolts 58.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A console attachable to a vehicle to control a transmission thereof; comprising:
    an enclosure;
    a plate forming the top of said enclosure, said plate including an indentation forming a trough therein and including a channel through said plate in an upraised portion thereof adjacent said trough;
    a gearshift regulator extending through said channel, said regulator serving to control a transmission of a vehicle; and
    a parking brake actuator recessed within said trough, said actuator serving to control a parking brake of said vehicle.

2. A console as in claim 1, wherein the length of said channel is parallel to the direction of movement of said actuator.

3. A console as in claim 2, including a removable padded panel on the side of said enclosure, said panel providing access to the interior of said console, the padding on said panel serving to protect an operator from injury through striking said panel.

4. A console as in claim 3, wherein said panel is located opposite a miter gear segment attached to said regulator adjacent an end thereof within said enclosure.

5. A console as in claim 4, wherein said plate is detachably attached to form the top of said enclosure.

6. A console as in claim 5, wherein said channel includes a plurality of steps therein to provide step-wise adjustment of said regulator and thereby of said transmission.

* * * * *